United States Patent
Luo et al.

(10) Patent No.: US 9,165,468 B2
(45) Date of Patent: Oct. 20, 2015

(54) VIDEO BASED INTELLIGENT VEHICLE CONTROL SYSTEM

(75) Inventors: Yun Luo, Ann Arbor, MI (US); Dieter Hoetzer, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 1049 days.

(21) Appl. No.: 12/758,394

(22) Filed: Apr. 12, 2010

(65) Prior Publication Data

US 2011/0251768 A1    Oct. 13, 2011

(51) Int. Cl.
| | |
|---|---|
| G06F 7/70 | (2006.01) |
| G06F 19/00 | (2011.01) |
| G06G 7/76 | (2006.01) |
| G06G 7/00 | (2006.01) |
| G08G 1/16 | (2006.01) |
| B60W 30/12 | (2006.01) |
| B60W 30/16 | (2012.01) |
| G06K 9/32 | (2006.01) |
| G06K 9/00 | (2006.01) |

(52) U.S. Cl.
CPC ............... *G08G 1/16* (2013.01); *B60W 30/12* (2013.01); *B60W 30/16* (2013.01); *G06K 9/00798* (2013.01); *G06K 9/00805* (2013.01); *G06K 9/3241* (2013.01); *G08G 1/167* (2013.01); *B60W 2420/42* (2013.01); *G06K 2209/23* (2013.01)

(58) Field of Classification Search
CPC .................................................... B60R 21/013
USPC .......................................................... 701/70
See application file for complete search history.

(56) References Cited

U.S. PATENT DOCUMENTS

| | | | | |
|---|---|---|---|---|
| 6,094,507 | A * | 7/2000 | Monden | 382/195 |
| 6,317,691 | B1 * | 11/2001 | Narayan et al. | 701/301 |
| 6,570,583 | B1 * | 5/2003 | Kung et al. | 345/661 |
| 6,711,293 | B1 | 3/2004 | Lowe | |
| 7,177,750 | B2 | 2/2007 | Schroder | |

(Continued)

FOREIGN PATENT DOCUMENTS

| | | |
|---|---|---|
| CN | 101089917 | 12/2007 |
| CN | 101458078 | 6/2009 |

(Continued)

OTHER PUBLICATIONS

PCT/US2011/031745 International Search Report and Written Opinion, 8 pages.

(Continued)

*Primary Examiner* — Khoi Tran
*Assistant Examiner* — Harry Oh
(74) *Attorney, Agent, or Firm* — Michael Best & Friedrich LLP

(57) ABSTRACT

A system for longitudinal and lateral control of a vehicle. The system includes a camera generating a plurality of images representative of a field of view in front of the vehicle, and a controller receiving the plurality of images. The controller detects an object in the plurality of images, extracts a plurality of features from the plurality of images, generates a reference feature depiction based on the plurality of features from one or more of the plurality of images, generates a comparison feature depiction based on the plurality of features from one of the plurality of images, compares the reference feature depiction and the comparison feature depiction, and determines a longitudinal position of the vehicle relative to the object based on differences between the reference feature depiction and the comparison feature depiction.

22 Claims, 8 Drawing Sheets

(56) References Cited

U.S. PATENT DOCUMENTS

| | | | |
|---|---|---|---|
| 7,216,023 B2 | 5/2007 | Akita | |
| 7,268,700 B1 * | 9/2007 | Hoffberg | 340/905 |
| 7,322,011 B2 * | 1/2008 | Brewer et al. | 715/800 |
| 7,389,172 B2 | 6/2008 | Sugano | |
| 7,734,419 B2 | 6/2010 | Kondoh | |
| 2004/0193374 A1 * | 9/2004 | Hac et al. | 701/301 |
| 2005/0237224 A1 * | 10/2005 | Gotfried | 340/929 |
| 2006/0161331 A1 | 7/2006 | Kumon et al. | |
| 2007/0154068 A1 * | 7/2007 | Stein et al. | 382/106 |
| 2007/0276577 A1 | 11/2007 | Kuge et al. | |
| 2008/0043099 A1 * | 2/2008 | Stein et al. | 348/118 |
| 2008/0319670 A1 * | 12/2008 | Yopp et al. | 701/301 |
| 2009/0164109 A1 | 6/2009 | Maruyama | |
| 2010/0253539 A1 * | 10/2010 | Seder et al. | 340/903 |

FOREIGN PATENT DOCUMENTS

| | | |
|---|---|---|
| CN | 101465033 | 6/2009 |
| EP | 1995705 | 11/2008 |
| WO | 2009106162 | 9/2009 |

OTHER PUBLICATIONS

H. Bay, T. Tuytelaars, and L. Van Gool, "SURF: Speeded Up Robust Features," scientific paper, undated, pp. 1-14.

MOBILEYE, "Mobileye AWS-4000" brochure, Sep. 2007, 4 pages.

MOBILEYE, "Mobileye Advance Warning System" brochure, Aug. 2008, 6 pages.

MOBILEYE, "Mobileye C2-170" brochure, Jul. 2009, 2 pages.

Robert Bosch GMBH, "Multi Purpose Camera MPC" from http://rb-k.bosch.de/en/safety_comfort/driving_comfort/driverassistancesystems/mpc.html (Nov. 2, 2009) 1 page.

Robert Bosch GMBH, "Bosch North America—Bosch's Vehicle Motion and Safety Technologies Aid in Reducing Vehicle-Related Injuries, Fatalities" from http://www.bosch-press.com/tbwebdb/bosch-usa/en-US/PressText.cfm? &nh=00&Search= . . . (Nov. 2, 2009) 2 pages.

Chinese Office Action for Application No. 201180018668.3 dated Jul. 31, 2014 (8 pages—with English Translation).

\* cited by examiner

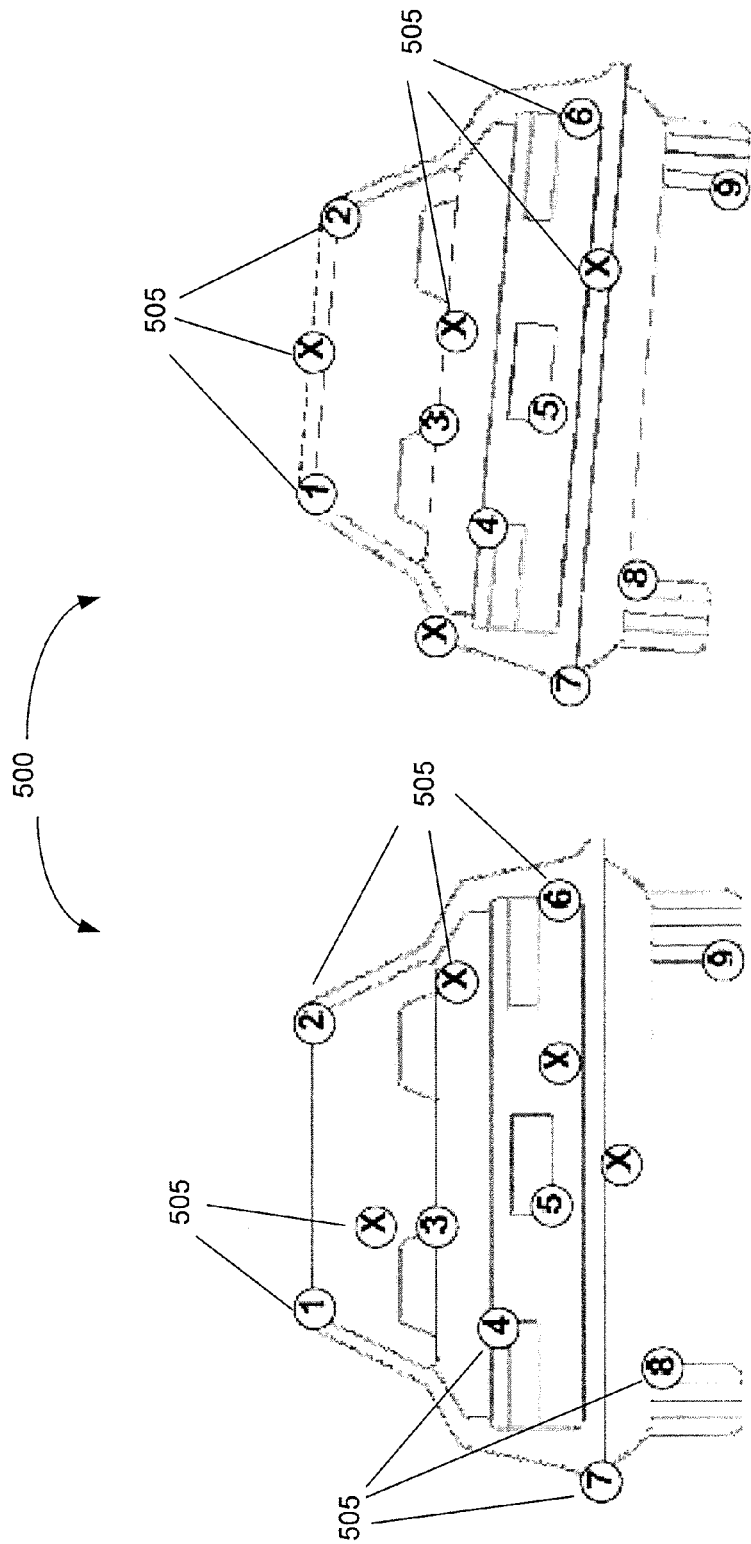

US 9,165,468 B2

VIDEO BASED INTELLIGENT VEHICLE CONTROL SYSTEM

FIELD OF THE INVENTION

The present invention relates to an intelligent vehicle control system which performs lateral and longitudinal control of the vehicle based on images obtained by a video camera.

BACKGROUND

There are a wide range of automotive applications that enhance a driver's experience, and reduce stress under various driving conditions. These applications use different sensor technologies, including camera-based intelligent systems. Camera-based intelligent systems (i.e., vision systems) provide live images to an operator, and utilize image processing and pattern recognition algorithms to assist drivers in lateral control of a vehicle. Using light sensing, these vision systems detect lanes and recognize vehicles and other objects in the path of a vehicle. In contrast, vehicle longitudinal controls, which assist a driver in maintaining a safe following distance, provide collision warning, assist in braking, and the like are accomplished using radar or other range finder systems (which do not rely on sensing light).

SUMMARY

Present vehicle systems often use video images to perform lateral control, but use technologies other than video for longitudinal control. However, human beings are able to use visual information to make complex driving decisions for both lateral and longitudinal control. Significant advantages can be realized in a system which combines longitudinal vehicle control with other video-based, driver-assistance functions (e.g., lateral control). These advantages include reduced cost, ease of manufacture, and improved functionality.

Embodiments of the invention include a single camera system that controls the vehicle both laterally and longitudinally to follow a target vehicle on a highway or arterial road. Driving lanes and vehicles are detected by the system in real time. A human machine interface (e.g., a single button, a display, a voice command system) of the system enables a driver to confirm or select a target vehicle to follow. Once the target is selected, the video system accurately and continuously measures the longitudinal and lateral offset from the host vehicle to the target vehicle. A closed-loop control system uses measurements (e.g., based on video images), vehicle dynamics (e.g., speed, yaw rate), and other environmental variables to assist the driver to maintain the vehicle within its lane, and to maintain a constant and/or safe distance from the target vehicle. The system also allows for autonomous vehicle control (i.e., following a target without driver intervention).

In one embodiment, the invention provides a system for longitudinal and lateral control of a vehicle. The system includes a camera generating a plurality of images representative of a field of view in front of the vehicle, and a controller receiving the plurality of images. The controller detects an object in the plurality of images, extracts a plurality of features from the plurality of images, generates a reference feature depiction based on the plurality of features from one or more of the plurality of images, generates a comparison feature depiction based on the plurality of features from one of the plurality of images, compares the reference feature depiction and the comparison feature depiction, and determines a longitudinal position of the vehicle relative to the object based on differences between the reference feature depiction and the comparison feature depiction.

In another embodiment, the invention provides a method of controlling a vehicle using a forward looking camera. The method includes the acts of detecting an object in a plurality of images generated by a camera, extracting a plurality of features from the plurality of images, generating a reference feature depiction based on the plurality of features from one or more of the plurality of images, generating a comparison feature depiction based on the plurality of features from one of the plurality of images, comparing the reference feature depiction and the comparison feature depiction, and determining a longitudinal position of the vehicle relative to the object based on differences between the reference feature depiction and the comparison feature depiction.

Other aspects of the invention will become apparent by consideration of the detailed description and accompanying drawings.

BRIEF DESCRIPTION OF THE DRAWINGS

FIGS. 5A and 5B are exemplary images of a target vehicle showing various features that have been extracted from the images with detected correspondences.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
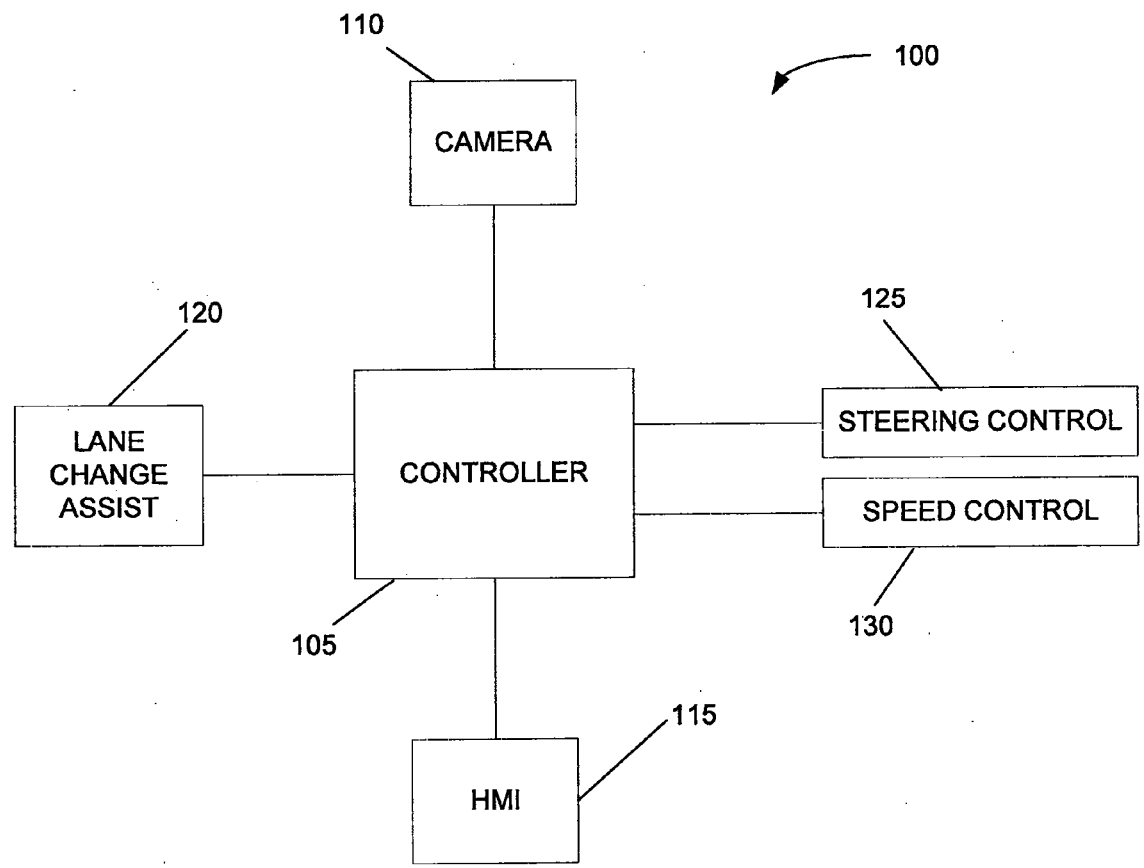
FIG. 1 is a block diagram of an embodiment of a system for controlling a vehicle laterally and longitudinally using images from a camera.

FIG. 1 shows a block diagram of a system 100 incorporating an embodiment of the invention. The system 100 includes a controller 105, a camera 110, a human-machine interface (HMI) 115, a lane change assist system 120, a steering control 125, and a speed control 130. In some embodiments, the camera 110 is a monocular camera employing a suitable light receiving technology (e.g., CMOS or CCD).

Depending on the type of light receiving technology, the camera 110 captures images in color or grayscale in the visible and/or infrared spectrum. Color images are analyzed based on differences in the colors of objects, while monochrome images are analyzed based on differences in grayscale. Images in the visible spectrum are detected by reflected light that has a frequency visible to the human eye. Alternatively, images in the near-infrared spectrum have frequencies higher than those visible to the human eye, and can be used to increase a look-ahead distance at night. Different cameras detect one or more of these images. The system 100 can analyze objects using one or more of these images provided by the camera 110.

In some embodiments, the camera 110 is mounted in a cabinet behind a windshield of the vehicle, and generates images of an area forward of the vehicle. The controller 105 includes a plurality of modules including an automatic target selection module (e.g., a rule-based expert system), a lane marking detection module, an object/vehicle detection module, a feature extraction module, a feature depiction generation module, a graph-based feature depiction tracking module, and a lane change target following module.

The vehicle control system 100 operates by tracking a target vehicle. The system 100 controls the vehicle to follow the target vehicle and maintain the vehicle at a set distance to the target vehicle. In order to accomplish these functions, the system 100 must know which vehicle is the target vehicle. Automatic target selection is used to identify the most relevant potential target vehicles in front of the vehicle. The system 100 functions based on information received from the camera (e.g., lane markings, object detection), and information about the vehicle and driver. Information about the vehicle comes from sensors on or within the vehicle and indicates things such as speed of the vehicle, yaw angle of the vehicle, steering angle, etc. Driver information includes whether the driver is engaging or activating a turn signal, accelerator, and/or brake along with information on the driver's line of sight (e.g., is the driver checking a side view mirror).

Figure 2:
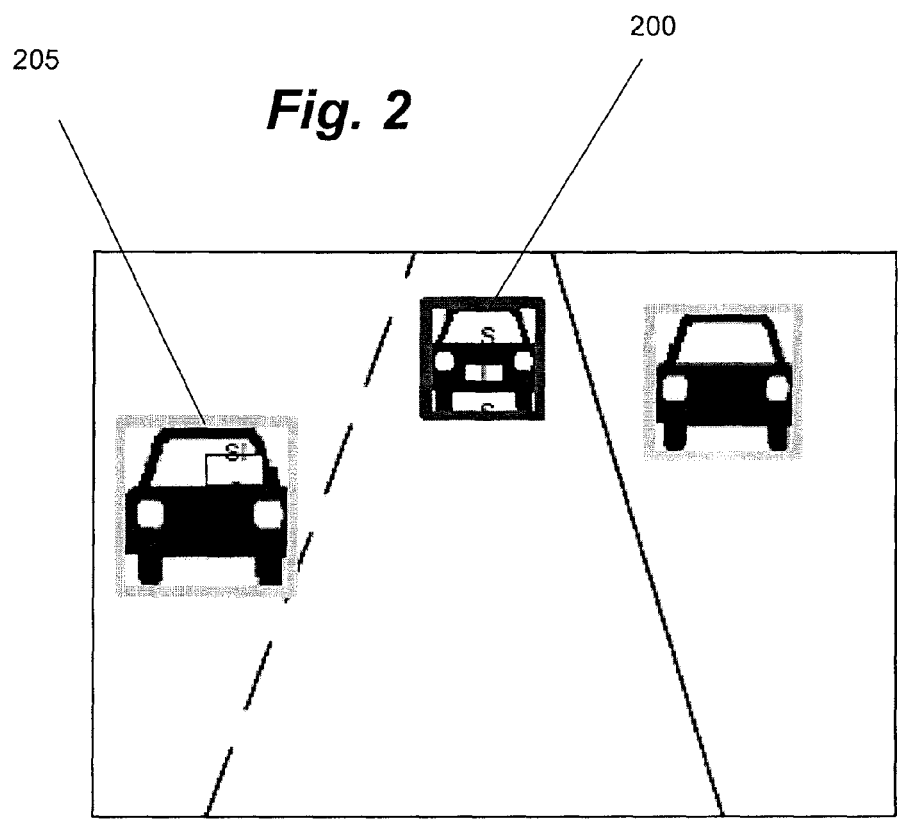
FIG. 2 is an exemplary image of a road and vehicles generated by the system of FIG. 1 for selecting a target vehicle to follow.

Using this information, the system 100 determines whether the driver is keeping the vehicle in the present lane, moving to another lane, maintaining speed, and/or changing speed. Using a rule-based expert system, the system 100 selects a vehicle in the camera image that is most likely to be a target vehicle. For example, in FIG. 2, if the system 100 determines that the driver is maintaining the vehicle in its present lane, the system 100 identifies vehicle 200 as the potential target vehicle. If the system 100 determines that the vehicle 100 is changing to the left lane, the system 100 identifies vehicle 205 as the potential target vehicle once the lane change is complete. Use of the camera image, which can identify lane markings and, thus, accurately determine what lane the vehicle and each of the potential target vehicles are in, allows for more accurate target acquisition than at least some radar-based systems. Once a potential target vehicle is identified, the system 100 highlights the potential target vehicle on a display (e.g., by displaying a box around the potential target vehicle) which also displays the image from the camera 110. The driver can then select the highlighted vehicle as a target vehicle and enable automatic control. Alternatively, the driver can select one of the other vehicles displayed to be the target vehicle for automatic control. As a further option, the driver can not select any vehicle as a target vehicle, instead maintaining manual control of the vehicle.

The HMI 115 allows the system 100 and an operator of the vehicle to exchange information (e.g., target selection, following distance, etc.). Information is provided to the operator audibly (e.g., voice, beeping, etc.), visually (e.g., video, lights, etc.), or haptically (e.g., steering wheel vibration). A video display is positioned in one or more places in the vehicle. For example, a video display can be positioned in a dashboard of the vehicle, in a steering wheel, or on a console. In some embodiments, video is provided to the driver via a heads-up display. In some embodiments, the video display shows an original image from the camera 110. In other embodiments, the video display shows a plan view, based on the images captured by the camera 110. The operator provides information to the system 100 via voice, buttons, and/or a touch screen. In some embodiments, voice commands allow an operator to identify a vehicle by color or type (e.g., car or truck) along with selecting and deselecting a target.

Figure 3A:
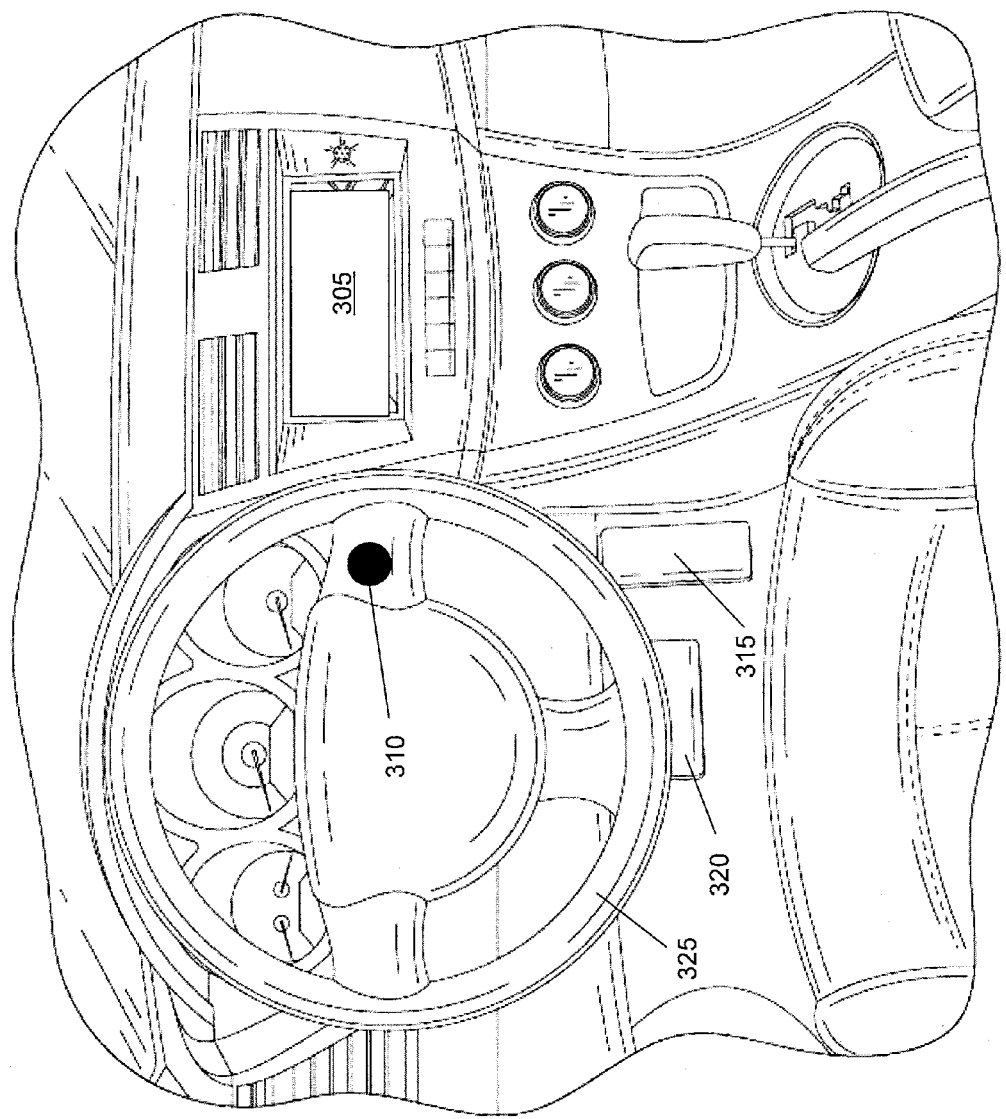
FIG. 3A is plan view of an inside of a vehicle showing an embodiment of a human-machine interface of the system of FIG. 1.
Figure 3C:
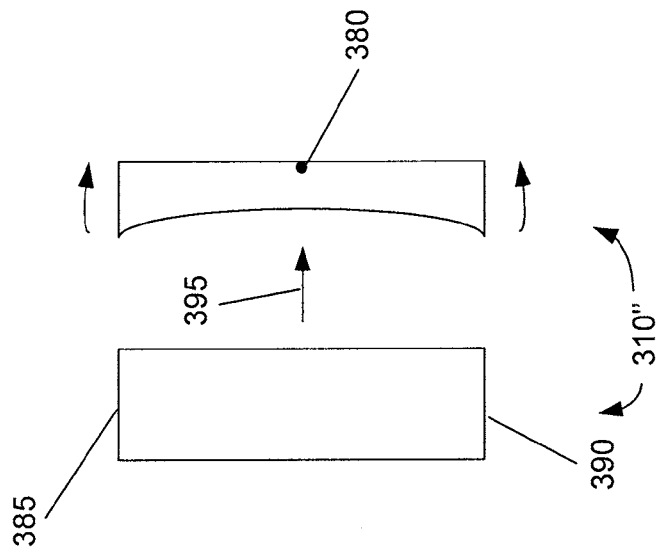
FIG. 3C is a top and side view of an embodiment of a toggle button of the human-machine interface of FIG. 3A.

FIG. 3A shows an embodiment of the HMI 115. The HMI 115 includes a video display 305 and a button 310. Other elements that enable the operator to provide feedback (e.g., an input) or information to the system 100 include an accelerator 315, a brake pedal 320, a steering wheel 325, and a turn signal (not shown). The video display 305 displays an image from the camera 110 along with additional information provided by the controller 105 (e.g., target identification). The button 310 allows an operator to select the target (e.g., engage following), deselect the target (e.g., disengage following), and adjust following distance. In some embodiments, the button 310 has a translucent portion for displaying a plurality of colored lights. For example, when the button 310 is gray or un-illuminated, the system 100 is indicating that the system 100 has not identified a target to follow. When the button 310 is a dark color (e.g., blue) or flashing, the system 100 is indicating that a target is identified (e.g., as shown on the display 305), and pressing the button will select the target and engage following. When the button 310 is a bright color (e.g., green), the system 100 is indicating that the following mode is active. Pressing the button 310 when following mode is active disengages the target, and returns the vehicle to manual control.

In some embodiments, the button 310 has a toggle or spin function. FIG. 3A shows a spin button 310' having a flange 350 and a roller ball 355. A user rotates the roller ball 355 in any direction to move the target vehicle identification on the display 305. When the desired target vehicle is identified on the display 305, the user presses the roller ball 355 down (see arrow 360) to select the target vehicle. Spinning the roller ball 355 upward (see arrow 365) when in the following mode instructs the system 100 to reduce a following distance (i.e., the distance from the vehicle to the target vehicle). Spinning the roller ball 355 downward (see arrow 370) when in the following mode instructs the system 100 to increase the following distance.

Figure 3B:
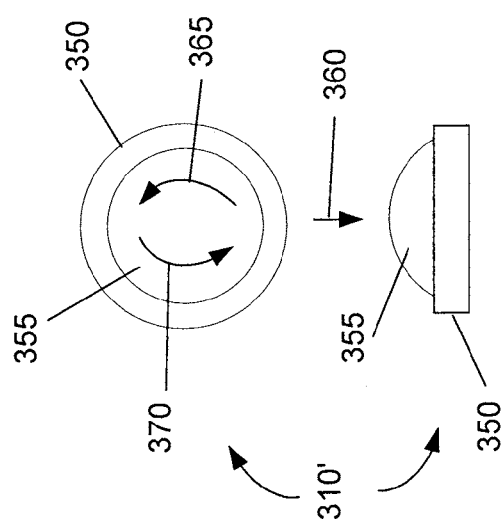
FIG. 3B is a top and side view of an embodiment of a spin button of the human-machine interface of FIG. 3A.

FIG. 3B shows a toggle button 310". The toggle button 310" is rotatable around a pivot point 380. A user toggles the button 310" by pressing an upward end 385 or a downward end 390 of the button 310" to move the target vehicle identification on the display 305. When the desired target vehicle is identified on the display 305, the user presses the toggle button (see arrow 395) to select the target vehicle. Toggling the upward end 385 of the button 310" when in following mode instructs the system 100 to reduce a following distance (i.e., the distance from the vehicle to the target vehicle). Toggling the downward end 390 of the button 310" when in the following mode instructs the system 100 to increase the following distance.

In some embodiments, the button 310 also indicates when the vehicle is too close to another vehicle (e.g., tailgating) by illuminating a special color light (e.g., red).

Figure 4:
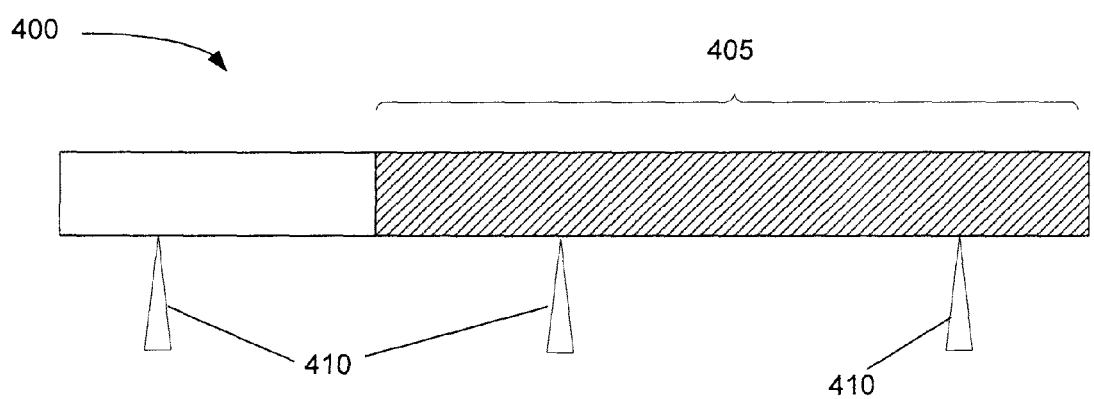
FIG. 4 is an embodiment of a following distance indicator.

The following distance is indicated on the display 305 via the relative size of the target vehicle (e.g., the larger the target vehicle image, the closer the distance). In addition, the display 305 can include a following distance indication in the form of a digital readout indicating the distance to the target vehicle (e.g., in feet). FIG. 4 shows an alternate embodiment of a following distance indicator 400 for indicating to an operator of the vehicle a current distance to a target vehicle 405 along with one or more recommended following distances 410. In some embodiments, the following distance indicator 400 is provided on the display 305 or as a stand-alone indication (e.g., provided on the dashboard of the vehicle).

In some embodiments, the operator adjusts the following distance by gently pressing the accelerator 315 (i.e., to reduce following distance) or the brake 320 (i.e., to increase the following distance). In addition, a heavier push of the accelerator 315 or the brake 320 disengages following of the target vehicle (e.g., similar to the operation of a cruise control), returning the vehicle to manual control. Other methods of disengaging following of the target vehicle include turning the steering wheel 325 (e.g., to change lanes) and engaging a turn indicator switch.

In some embodiments, voice commands allow the operator to modify the operation of the system 100. For example, voice commands can be used to select a potential target vehicle based on the color of the object on the display 305 or the type of vehicle shown (e.g., from a car to a motorcycle). Voice commands can also be used to engage/disengage following of the target, modify selection of a target, change a following distance, and indicate a desire to change lanes or center the vehicle in a lane.

The system 100 identifies a target vehicle and maintains lateral and longitudinal proximity to the target vehicle using images obtained by the camera 110. Objects in front of the vehicle (i.e., in a field of view of the camera 110) are detected using a video-based, object-detection system such as the Bosch Multiple Purpose Camera. In some embodiments, object detection is performed by the camera 110. In other embodiments, object detection is performed by the controller 105 using an image provided by the camera 110. The system 100 parses the detected objects and identifies a target vehicle from the objects detected. Once the operator selects the target vehicle, the system 100 maintains lateral and longitudinal proximity to the target vehicle using feature extraction and graph-based tracking.

When the target is selected, the system 100 generates a reference feature depiction (i.e., a base model) using feature extraction. For example, FIG. 5A shows a first image of a vehicle 500. The system 100 extracts a plurality of distinctive features 505 from the first image. The system 100 saves a descriptor of the properties of each feature 505 along with the location of each feature 505. In some embodiments, the system 100 uses feature classification to verify that the features extracted are from an intended target object.

In some embodiments, the extracted features can be used as the reference feature depiction. In other embodiments, the system 100 uses multiple images to obtain feature and edge correspondences and generate the reference feature depiction. FIG. 5B shows a second image of the vehicle at a time t+Δt (i.e., at a time Δt after the first image was captured). Once again, the system 100 extracts a plurality of distinctive features 505 from the second image. Numbered features 505 in FIGS. 5A and 5B represent features that were extracted by the system 100 for both the first and second image. Features represented by an "x" are features that were extracted by the system 100 from one of the images but not the other. Because the "x" features do not have corresponding features in the other image, they are discarded by the system 100.

The system 100 uses feature correspondence to match features f1 in the first image with features f2 in the second image (i.e., f1 $\Leftrightarrow$ f2). The system 100 also generates a metric of the level of confidence the system 100 has that the features f1 and f2 correspond—conf(f1, f2). This confidence level is then compared to a feature correspondence threshold, $$\mathrm{conf}(f1, f2) \geq \mathrm{threshold}$$

If the confidence level exceeds the threshold, the system 100 determines that there is a correspondence between f1 and f2. The feature correspondence threshold is adjusted to control the size of the feature depiction. For example, the higher the level of the threshold, the fewer the number of features that will be found to correspond between a first and second image. The level of the threshold is chosen to obtain an efficient feature depiction calculation. That is, the level of the threshold is chosen to provide enough features to accurately identify the target while using as small a number of features as possible so that calculations can be performed quickly.

Figures 6A, 6B:
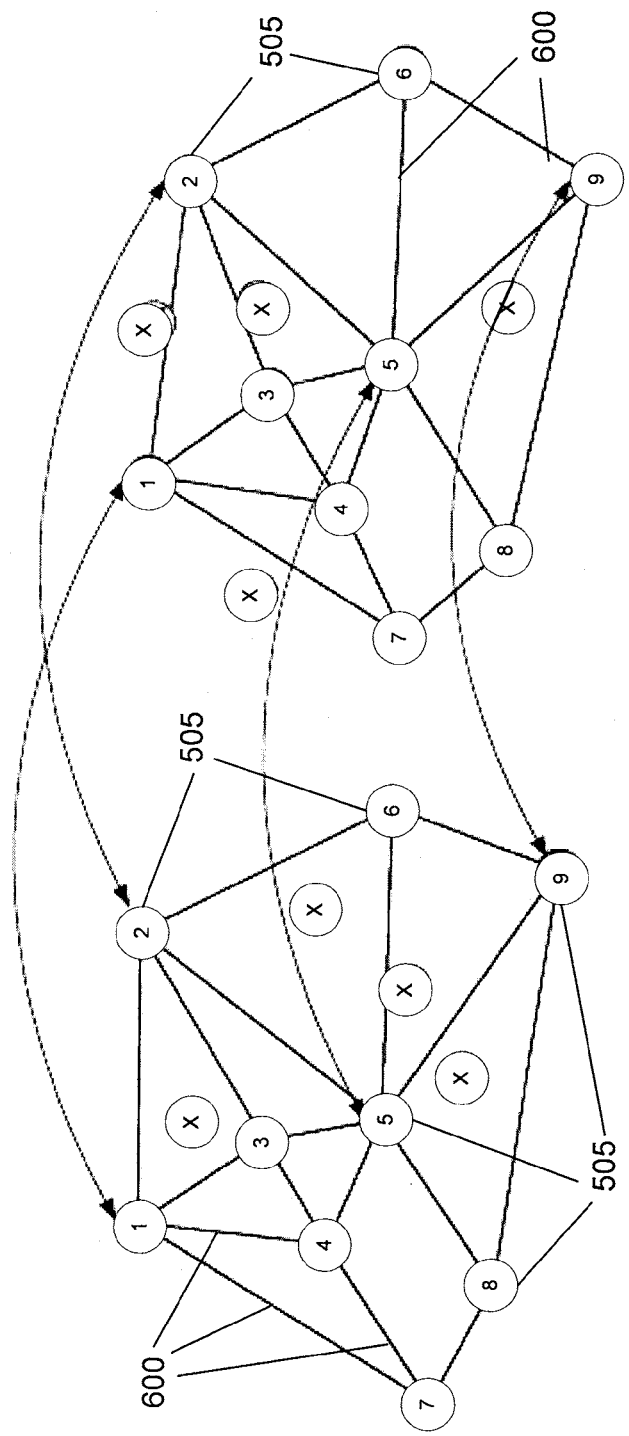
FIGS. 6A and 6B are exemplary comparison feature depictions generated from the extracted corresponding features of FIGS. 5A and 5B.

As shown in FIGS. 6A and 6B, the system 100 also generates edges 600 between features 505. The result is an object feature depiction structured as a feature planar graph topology. Using edge correspondence, the system 100 looks for pairs of features that are matched between the first and second images:

$$f_A(1) \Leftrightarrow f_B(1) \text{ and } f_A(2) \Leftrightarrow f_B(2)$$

where $f_A(1)$ is a first feature from image A, $f_A(2)$ is a second feature from image A, $f_B(1)$ is a first feature from image B, etc.

When this occurs, there is a correspondence between an edge $E(f_A(1), f_A(2))$ in the first image and an edge $E(f_B(1), f_B(2))$ in the second image (i.e., $E(f_A(1), f_A(2)) \Leftrightarrow E(f_B(1), f_B(2))$). The system 100 then generates an edge confidence level that is the product of the corresponding confidences of the matched features:

$$\mathrm{conf}(E(f_A(1), f_A(2)), E(f_B(1), f_B(2))) = \mathrm{conf}(f_A(1), f_B(1)) \times (f_A(2), f_B(2))$$

Using the features and corresponding edges, a reference feature depiction is derived. The feature depiction includes a set of distinctive features as vertices $V_B$ with comprehensive image properties, and edges $E_B$ representing a spatial distance between the positions of the features in the image space. The features are derived from the target region of the image, and can be verified using special classification techniques to ensure they belong to a meaningful object to track.

Comparison feature depictions are generated from subsequent images from the camera 110 following generation of the reference feature depiction. The comparison feature depiction includes a set of extracted features having a one-to-one correspondence to the features of the reference feature depiction. To achieve robust feature depiction tracking, the most complex comparison feature depiction (Graph($V_D$, $E_D$)) that has a perfect match for the reference feature depiction (Graph($V_B$, $E_B$)) is generated (e.g., using graph sub-isomorphism). However, the sizes of the graphs are capped due to limits on computational complexity (e.g., processing speed and/or power). If a perfect match is not found between the comparison feature depiction and the reference feature depiction, the vertices of the comparison feature depiction are gradually reduced until a sub-isomorphism to the reference feature depiction is found. If the size of the final matched graph is less than a threshold, the match is considered unreliable. In some embodiments, a target is considered lost following a plurality of consecutive unreliable matches.

Once a match between the comparison feature depiction and the reference feature depiction is found, the system 100 determines whether the distance between the vehicle and the target has changed. The system 100 makes this determination by comparing the scale of the comparison feature depiction to the reference feature depiction (e.g., if the scale is unchanged, the distance is unchanged). To make this determination, the system 100 uses the following equation to generate a weighted measurement of all the changes in edge length between the reference feature depiction and the comparison feature depiction.

$$\text{scale\_change} = \frac{\sum_i \text{conf}(E_D(i), E_B(i)) \frac{|E_D(i)|}{|E_B(i)|}}{\sum_i \text{conf}(E_D(i), E_B(i))}$$

where i is the number of all matched edges, |E| denotes the spatial distance of an edge between two feature points, and $\text{conf}(E_D(i), E_B(i))$ are the confidences of the matched edges between the reference and comparison feature depictions.

Figure 7:
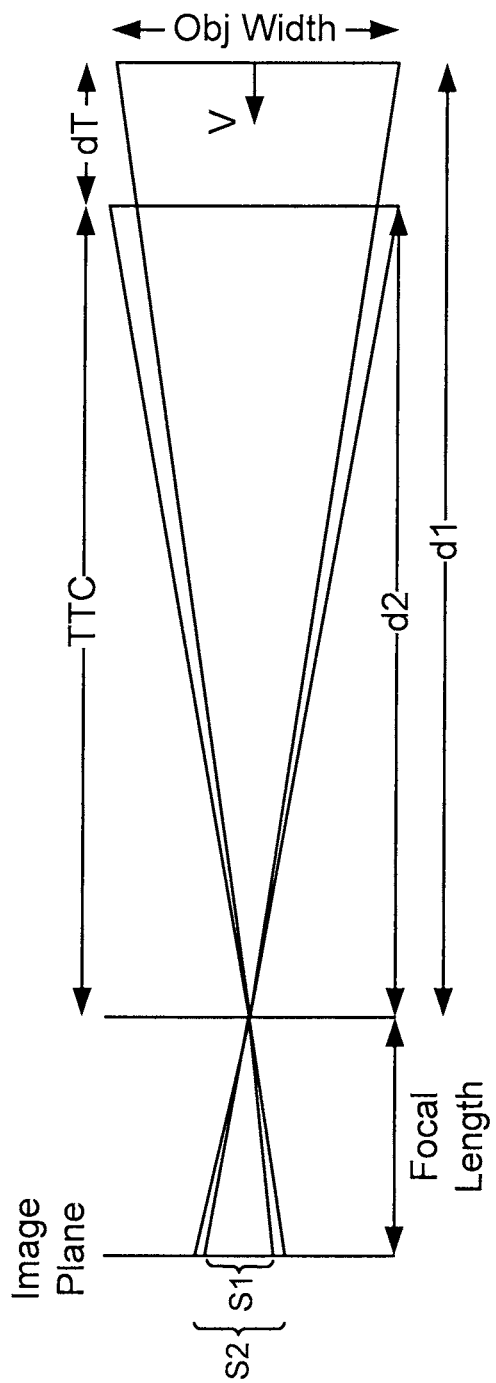
FIG. 7 is an illustration of a change in scale between two images.

Using the scale change, the system 100 accurately determines a following time (e.g., the time for the vehicle to reach the present position of the target vehicle). In addition, a time to collision is calculated using the scale change between consecutive image frames. Referring to FIG. 7, using the scale change s1 to s2, the system 100 is able to determine the change in distance d1 to d2. Because the size of the target object does not change, the system 100 is able to calculate the change in distance between d1 and d2. The time dT corresponds to the time between the images. V is the velocity with which the vehicle is approaching the target object, and TTC is then the time to collision if the velocity remains the same.

The system 100 continuously detects changes in the scale of the comparison feature depiction and controls the vehicle (e.g., increases/decreases speed) to maintain, subject to modification by the operator as previously discussed, the following distance to the target vehicle.

The reference feature depiction, while generally static once it is generated, can be updated if the system 100 determines that there are more effective features available. The system 100 uses the comparison feature depictions to determine if more effective features consistently appear that are not included in the reference feature depiction. If such features are found, the reference feature depiction is modified to include these features. In addition, if there are features in the reference feature depiction that are not effective (e.g., are not consistently found in the comparison feature depictions), the system 100 modifies the reference feature depiction to remove these features, thus improving storage and computational efficiencies.

Figure 8:
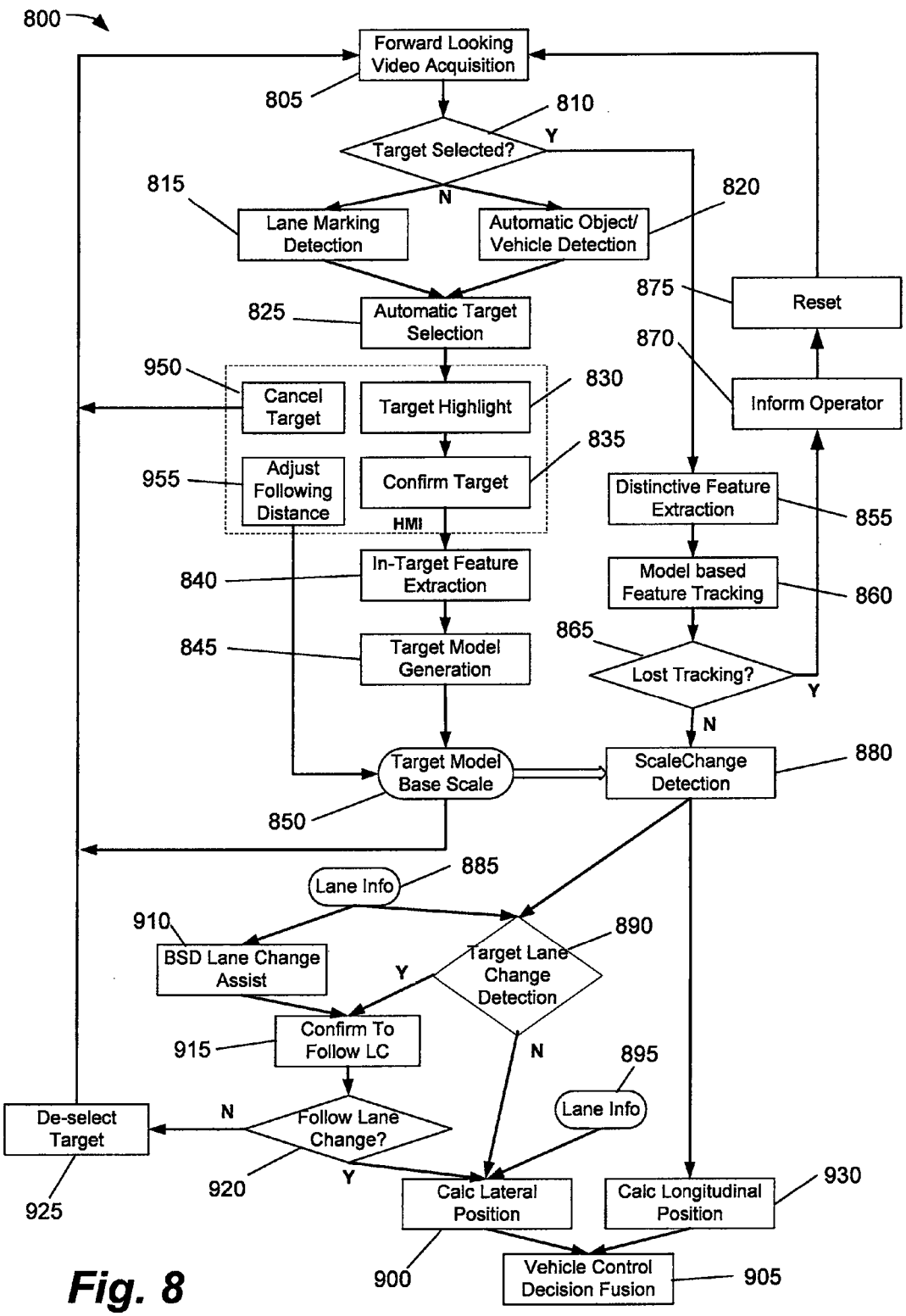
FIG. 8 shows an embodiment of a process for controlling a vehicle laterally and longitudinally using images from a camera.

FIG. 8 represents a process 800 for lateral and longitudinal control of a vehicle by the system 100. The process 800 begins with the acquisition of video from the forward looking camera 110 (block 805). Next, the controller 105 checks if a target vehicle has been previously selected (block 810). If a target has not been previously selected, the controller 105 analyzes the acquired video image to detect markings that identify lanes in the road (block 815), and also analyzes the acquired video for vehicles (block 820). Based on the analysis performed at steps 815 and 820, the controller 105 selects a vehicle in the video that the controller 105 determines is the most likely target vehicle (block 825). In addition, the controller 105 identifies other vehicles in the video image. The controller 105 displays the video image on the display 305 of the HMI 115, highlighting the most likely target vehicle (block 830). In some embodiments, the controller 105 also highlights the other vehicles such that the most likely target is differentiated from the other vehicles. Next the controller 105 waits for the user to confirm (select) the target (block 835). The user can select as the target, a vehicle other than the most likely target identified by the controller 105 (e.g., by scrolling a button or touching another vehicle on a touch screen). Once the target is confirmed, the controller 105 performs the feature extraction process (block 840). Using the extracted features, the controller 105 develops a target feature depiction (block 845) of the target vehicle. From the target feature depiction, the controller 105 creates the reference feature depiction of the target vehicle (block 850). The controller 105 then uses the reference feature depiction to detect changes in the relationship between the vehicle and the target vehicle (e.g., lateral or longitudinal movement).

If, at block 810, a target had previously been selected, the controller 105 performs feature extraction on the image of the target vehicle (block 855). Using the extracted features, the controller generates a comparison feature depiction (block 860). The controller 105 uses the same features as were used in the reference feature depiction (see steps 840 and 845). The target feature depiction is then compared to the reference feature depiction (block 865). If the differences are too great (e.g., a vehicle different than the target vehicle is in the image—for example, if another car moves between the vehicle and the target vehicle), the controller 105 determines that the target has been lost. The controller 105 then informs the user that the target has been lost (block 870), and resets the system such that no target is selected (block 875). The controller 105 then continues at block 805 with selecting a new target.

When the target vehicle has not been lost (block 865), the controller 105 performs a scale change detection process (as described above) (block 880) to determine changes in the target vehicle's position (both laterally and longitudinally) compared to the vehicle. If the target vehicle's lateral position has changed relative to the vehicle, the controller 105 uses lane information (block 885), obtained from a lane detection system using the video camera 110, to determine if the target vehicle is changing lanes (block 890). If the target vehicle is not changing lanes, the controller 105 uses the lane information (block 895) to calculate the lateral position of the vehicle (block 900) and performs a vehicle control function (block 905) which, among other things, maintains the vehicle in its lane.

If, at block 890, the controller 105 determines that the target vehicle is changing lanes, the controller 105, via a lane change assist system (or a blind spot detection system) (block 910) determines whether it is safe for the vehicle to also change lanes (i.e., follow the target vehicle). The controller 105 provides information on the lane change (e.g., that the target is changing lanes, whether a lane change is safe or not, etc.) to the operator for a confirmation that the operator wants to continue to follow the target vehicle and change lanes (block 915). In some embodiments, when the system 100 is automatically controlling the vehicle, the indication allows the operator to disengage following. In such an embodiment, lack of action by the operator serves as confirmation that the operator wants to continue to follow the target vehicle and change lanes. If the operator indicates that the vehicle should not continue to follow the target vehicle (block 920), and, thus, not change lanes, the controller 105 de-selects the target vehicle (block 925) and control of the vehicle is returned to the operator (i.e., manual control). The operator can indicate the desire to follow or not follow the target vehicle in numerous ways such as, turning the steering wheel, stepping on the brake, stepping on the accelerator, doing nothing, pressing a button, pressing a window on a touch screen, etc. If the operator indicates a desire to follow the target vehicle and change lanes, the controller 105 uses the lane information (block 895) and the target vehicle information to calculate a lateral position of the vehicle (block 900) and performs a vehicle control function (block 905) which, among other things, drives the vehicle into the new lane or allows the operator to move the vehicle to the new lane.

In addition, if the target vehicle is not de-selected, the controller 105 determines a longitudinal position of the target vehicle relative to the vehicle (block 930) (i.e., the following distance), and performs a vehicle control function (block 905) which, among other things, maintains a distance between the vehicle and the target vehicle.

The human-machine interface, in addition to highlighting potential targets and allowing the operator to select/confirm the target, also allows the operator to cancel the current target (block 950) and to adjust the following distance between the vehicle and the target vehicle (block 955). When the following distance is adjusted (block 955), the controller 105 adjusts the reference feature depiction (block 850) by a scale factor to reflect the change (e.g., increasing the scale for a shorter following distance or decreasing the scale for a longer following distance), using the adjusted reference feature depiction to perform subsequent scale change detection (block 880).

The invention contemplates various combinations of assistance of the system 100 to the operator (e.g., feedback) and automatic control by the system 100. In some embodiments, the system 100 provides feedback to the operator about operation of the vehicle relative to the target vehicle. For example, the system 100 can inform the operator that the target vehicle is changing lanes, enabling the operator to move the vehicle into the lane the target vehicle is moving to, assuming it is safe to do so. Conversely, if the operator is moving the vehicle into a new lane (e.g., drifting) when the target vehicle is not, the system 100 can warn the operator, allowing the operator to correct the vehicle's position or to disengage following of the target. In some embodiments, portions of control are performed by the system 100 automatically and portions of control are performed by the operator (with feedback from the system 100). For example, the system 100 can provide automatic control of speed of the vehicle to maintain the following distance to the target while the operator receives feedback from the system 100 and controls lateral position (e.g., by steering). In some embodiments, the system 100 can maintain the vehicle in the center of the driving lane, while the operator performs steering for lane changes. Thus, a whole range of levels of control by the system 100 are contemplated from manual control with feedback from the system 100 to fully automatic control by the system 100.

Thus, the invention provides, among other things, a system for controlling the longitudinal and lateral position of a vehicle based on an image acquired by a camera. Various features and advantages of the invention are set forth in the following claims.

What is claimed is:

1. A system for longitudinal and lateral control of a vehicle, the system comprising:
    a camera generating a plurality of images representative of a field of view in front of the vehicle;
    a human-machine interface including a video display and configured to receive an input; and
    a controller receiving the plurality of images and
        detecting an object in the plurality of images,
        extracting a plurality of features from the plurality of images,
        generating a plurality of edges connecting pairs of the plurality of features, a length of the edges representing a spatial distance between the plurality of features;
        generating a reference feature depiction based on the plurality of features and the plurality of edges from one or more of the plurality of images,
        generating a comparison feature depiction based on the plurality of features and the plurality of edges from one of the plurality of images,
        comparing the reference feature depiction and the comparison feature depiction,
        determining a longitudinal position of the vehicle relative to the object based on differences between the reference feature depiction and the comparison feature depiction,
        adjusting a scale of the reference feature depiction based on the input received by the human-machine interface, and
        modifying a distance the vehicle maintains from the detected object such that a scale of the comparison feature depiction is about equal to the adjusted scale of the reference feature depiction.

2. The system of claim 1, wherein the controller determines a lateral position of the vehicle relative to the object based on a position of the comparison feature depiction in the plurality of images.

3. The system of claim 2, wherein the same images are used to determine the longitudinal position and the lateral position.

4. The system of claim 2, wherein the controller adjusts a speed and a direction of the vehicle to maintain the longitudinal position and the lateral position of the vehicle relative to the object.

5. The system of claim 1, wherein the reference feature depiction is generated using the plurality of features extracted from two or more of the plurality of images.

6. The system of claim 5, wherein the reference feature depiction includes the plurality of features extracted from two or more of the plurality of images have a level of confidence of corresponding features exceeds a threshold.

7. The system of claim 1, wherein the plurality of features used in the comparison feature depiction is reduced until the plurality of features of the comparison feature depiction match the plurality of features of the reference feature depiction.

8. The system of claim 7, further comprising determining that the object is not in the plurality of images when the plurality of features of the comparison feature depiction that match the plurality of features of the reference feature depiction are less than a threshold.

9. The system of claim 1, wherein a quantity of features for the reference feature depiction is chosen such that the quantity of features is large enough to ensure that the object is accurately identified and that the quantity of features is small enough to allow for computational efficiency.

10. The system of claim 1, wherein the longitudinal position of the vehicle relative to the object is determined based on a change of scale between the comparison feature depiction and the reference feature depiction.

11. The system of claim 10, wherein the controller uses a weighted measurement of changes in the length of the plurality of edges between the reference feature depiction and the comparison feature depiction to determine the change of scale.

12. The system of claim 1, wherein the human-machine interface comprises a rocker switch, the controller increasing the scale of the reference feature depiction when the rocker switch is pressed upward and decreasing the scale of the reference feature depiction when the rocker switch is pressed downward.

13. The system of claim 1, wherein the human-machine interface comprises a roller switch, the controller increasing the scale of the reference feature depiction when the roller switch is rolled in an upward direction and decreasing the scale of the reference feature depiction when the roller switch is rolled in a downward direction.

14. The system of claim 1, wherein the input is at least one of an accelerator of the vehicle, a brake pedal of the vehicle, a button, a voice command, and a touch screen.

15. The system of claim 1, wherein a status of the system includes an object to track has not been identified, an object to track been identified but not selected, an object is being tracked, and the vehicle is too close to an object.

16. The system of claim 15, further comprising a button, the button being lit in one of a plurality of colors to indicate the status of the system.

17. A method of controlling a vehicle using a forward looking camera, the method comprising:
  detecting an object in a plurality of images generated by a camera,
  displaying the object on an human machine interface;
  extracting a plurality of features from the plurality of images,
  generating a plurality of edges connecting pairs of the plurality of features, a length of the edges representing a spatial distance between the plurality of features;
  generating a reference feature depiction based on the plurality of features and the plurality of edges from one or more of the plurality of images,
  generating a comparison feature depiction based on the plurality of features and the plurality of edges from one of the plurality of images,
  comparing the reference feature depiction and the comparison feature depiction,
  determining a longitudinal position of the vehicle relative to the object based on differences between the reference feature depiction and the comparison feature depiction,
  receiving an input from the human-machine interface,
  adjusting a scale of the reference feature depiction based on the input received by the human-machine interface, and
  modifying a distance the vehicle maintains from the detected object such that a scale of the comparison feature depiction is about equal to the adjusted scale of the reference feature depiction.

18. The method of claim 17, further comprising determining a lateral position of the vehicle relative to the object based on a position of the comparison feature depiction in the plurality of images.

19. The method of claim 18, further comprising adjusting a speed and a direction of the vehicle to maintain the longitudinal position and the lateral position of the vehicle relative to the object.

20. The method of claim 17, further comprising reducing the plurality of features used in the comparison feature depiction until the plurality of features of the comparison feature depiction match the plurality of features of the reference feature depiction.

21. The method of claim 20, further comprising determining that the object is not in the plurality of images when the plurality of features of the comparison feature depiction that match the plurality of features of the reference feature depiction are less than a threshold.

22. The method of claim 17, further comprising using a weighted measurement of changes in the length of the plurality of edges between the reference feature depiction and the comparison feature depiction to determine the change of scale.

* * * * *